US010889290B2

(12) United States Patent
Suetake et al.

(10) Patent No.: US 10,889,290 B2
(45) Date of Patent: Jan. 12, 2021

(54) CONTROL APPARATUS FOR FOUR-WHEEL-DRIVE VEHICLE

(71) Applicant: Toyota Jidosha Kabushiki Kaisha, Toyota-shi Aichi-ken (JP)

(72) Inventors: Yusuke Suetake, Machida (JP); Noritsugu Iwazaki, Shizuoka-ken (JP); Hidehisa Kato, Shizuoka-ken (JP)

(73) Assignee: Toyota Jidosha Kabushiki Kaisha, Toyota Aichi-ken (JP)

( * ) Notice: Subject to any disclaimer, the term of this patent is extended or adjusted under 35 U.S.C. 154(b) by 0 days.

(21) Appl. No.: 16/690,861

(22) Filed: Nov. 21, 2019

(65) Prior Publication Data

US 2020/0164868 A1 May 28, 2020

(30) Foreign Application Priority Data

Nov. 27, 2018 (JP) .................................. 2018-220819

(51) Int. Cl.
| | | |
|---|---|---|
| *B60W 10/14* | (2012.01) | |
| *B60W 10/184* | (2012.01) | |
| *B60W 30/02* | (2012.01) | |
| *B60W 10/04* | (2006.01) | |
| *B60W 10/10* | (2012.01) | |
| *B60W 10/18* | (2012.01) | |
| *B60W 10/16* | (2012.01) | |

(52) U.S. Cl.
CPC ............ *B60W 30/02* (2013.01); *B60W 10/04* (2013.01); *B60W 10/10* (2013.01); *B60W 10/16* (2013.01); *B60W 10/18* (2013.01); *B60W 2400/00* (2013.01); *B60W 2520/28* (2013.01); *B60W 2710/10* (2013.01); *B60W 2710/12* (2013.01); *B60W 2710/18* (2013.01)

(58) Field of Classification Search
CPC .... B60W 10/14; B60W 10/16; B60W 10/184; B60W 30/02; B60W 2510/12; B60W 2520/28; B60W 2520/403; B60W 2520/406; B60W 2710/12; B60W 2710/18

See application file for complete search history.

(56) References Cited

U.S. PATENT DOCUMENTS

| | | | |
|---|---|---|---|
| 2007/0029127 A1 | 2/2007 | Mori et al. | |
| 2014/0145498 A1* | 5/2014 | Yamakado ............ | B60W 30/02 303/3 |
| 2017/0326976 A1* | 11/2017 | Burt ................... | B60K 17/3515 |
| 2018/0297605 A1* | 10/2018 | Kasaiezadeh Mahabadi ............. | B60W 40/109 |

FOREIGN PATENT DOCUMENTS

| | | |
|---|---|---|
| JP | H10067313 A | 3/1998 |
| JP | 2007-045194 A | 2/2007 |

* cited by examiner

*Primary Examiner* — Edwin A Young
(74) *Attorney, Agent, or Firm* — Dinsmore & Shohl LLP (57) ABSTRACT

Provided is a control apparatus for a four-wheel-drive vehicle configured to, when a degree of transmission of a driving force to a side of rear wheels is smaller than a predetermined degree, calculate a correction value for a wheel speed based on a rotation-related value, and calculate a wheel speed through use of the rotation-related value and the correction value.

5 Claims, 4 Drawing Sheets

CONTROL APPARATUS FOR
FOUR-WHEEL-DRIVE VEHICLE

CROSS-REFERENCE TO RELATED
APPLICATIONS

The present application claims priority from Japanese patent application JP 2018-220819 filed on Nov. 27, 2018, the content of which is hereby incorporated by reference into this application.

BACKGROUND

Technical Field

The present disclosure relates to a control apparatus which is applied to a four-wheel-drive vehicle, including a front wheel differential device configured to transmit a driving force generated by a driving device to right and left front wheels, and a rear wheel final gear device configured to transmit the driving force to right and left rear wheels via a coupling device. Hereinafter, the four-wheel-drive vehicle is also simply referred to as a "vehicle".

Description of the Related Art

Hitherto, there has been proposed a four-wheel-drive vehicle (hereinafter, referred to as a "related-art vehicle") including a coupling device configured to change a transmission degree of a driving force generated by a driving device from a side of front wheels to a side of rear wheels (see Japanese Patent Application Laid-open No. 2007-045194). In the related-art vehicle, a final gear ratio on the side of the rear wheels is set to be smaller than a final gear ratio on the side of the front wheels, and therefore, rotation speeds of the rear wheels are increased by 2% to 5% compared to rotation speeds of the front wheels.

Further, there has been proposed a control apparatus for a vehicle configured to perform "vehicle behavior stabilization control" such as Anti-lock Brake System (ABS) and Traction Control System (TRC). Such a control apparatus detects a rotation speed for each wheel by using a wheel speed sensor provided in each wheel, and calculates a slip ratio for each wheel based on the detected rotation speed. The control apparatus controls a braking force in response to the slip ratio of each wheel to thereby stabilize a behavior of the vehicle.

Due to a difference in a degree of abrasion between tires of the wheels and/or a difference in air pressure between the tires, a situation may occur in which wheel diameters differ from each other. In the case where the wheel diameters differ from each other, even in a situation in which none of the wheels are slipping, the rotation speeds of the wheels detected by the wheel speed sensors differ from each other. Therefore, since the slip ratio calculated based on the rotation speed of the wheel becomes inaccurate, there is a possibility that the vehicle behavior stabilization control cannot be performed at an appropriate timing.

One of related-art control devices assumes that a difference in the rotation speed between the wheels in a situation in which the vehicle is traveling straight is based on a difference in the wheel diameter between the wheels. Then, the related-art control device calculates a correction coefficient for each wheel. The correction coefficient is calculated for each wheel for reducing influence arising from the difference in the wheel diameter based on the rotation speeds of the wheels. The related-art control device obtains a final wheel speed for each wheel by using the calculated correction coefficient (see Japanese Patent Application Laid-open No. Hei 10-67313).

For example, when the wheel diameter of a wheel is estimated to be smaller than an average wheel diameter of the four wheels, the correction coefficient for that wheel becomes a value smaller than "1". On the other hand, when the wheel diameter of a wheel is estimated to be larger than the average wheel diameter, the correction coefficient for that wheel becomes a value larger than "1".

In a situation in which the related-art vehicle is traveling in a four-wheel-drive state on a road surface having a low friction coefficient μ, the rear wheels rotate while slipping on the road surface due to the difference in the final gear ratio between the front wheels and the rear wheels. In such a situation, even if the wheel diameters are the same among the wheels, the rotation speeds of the rear wheels are higher than those of the front wheel. When calculating the correction coefficient under the above-mentioned situation, the related-art control device cannot appropriately calculate the correction coefficient for each wheel in accordance with the difference in the wheel diameter. That is, regardless of the difference in wheel diameter between the wheels, the correction coefficients for the respective front wheels become values larger than "1", and the correction coefficients for the respective rear wheels become values smaller than "1".

When the slip ratio is calculated for each wheel based on final wheel speeds corrected using the above-mentioned correction coefficients, the slip ratio becomes inaccurate. Furthermore, if it is determined based on such an inaccurate slip ratio whether to start/perform the vehicle behavior stabilization control, there arises a problem that the vehicle behavior stabilization control cannot be performed at an appropriate timing.

SUMMARY

The present disclosure provides a control apparatus for a four-wheel-drive vehicle configured to appropriately calculate the correction coefficient (correction value) in accordance with the difference in the wheel diameter even in the situation in which the four-wheel-drive vehicle such as the above-mentioned related-art vehicle is traveling, to thereby appropriately perform the vehicle behavior stabilization control.

A control apparatus for a four-wheel-drive vehicle according to one embodiment includes: a driving device (20, 50) configured to generate a driving force; a braking device (40) configured to apply a braking force to a left front wheel (Wfl), a right front wheel (Wfr), a left rear wheel (Wrl), and a right rear wheel (Wrr); a front wheel differential device (31) configured to transmit the driving force to a left front wheel axle (32L) and a right front wheel axle (32R), and allow a differential between the left front wheel axle and the right front wheel axle; a transfer gear device (33) configured to transmit the driving force to a side of the rear wheels through a propeller shaft (34); a rear wheel final gear device (35) configured to transmit the driving force from the propeller shaft to a left rear wheel axle and a right rear wheel axle, a final gear ratio on a side of the rear wheels being set to be smaller than a final gear ratio on a side of the front wheels; and a coupling device (361, 362, 400) configured to change a degree of transmission of the driving force from the propeller shaft to the left rear wheel axle and the right rear wheel axle.

The control apparatus further includes: a traveling state detector (82, 83, 84, 85) configured to detect traveling state information on a current traveling state of the vehicle, the traveling state information including a rotation-related value (Pi) which is a value related to a rotation speed of each of the left front wheel, the right front wheel, the left rear wheel and the right rear wheel; a coupling controller (60) configured to control a coupling torque of the coupling device based on the traveling state information to change the degree of transmission of the driving force to the left rear wheel axle and the right rear wheel axle; a wheel speed calculation controller (70) configured to: calculate, when at least a first condition is satisfied (S220: Yes), a correction value (Ki) for a wheel speed of each of the left front wheel, the right front wheel, the left rear wheel and the right rear wheel based on the rotation-related value, and calculate a wheel speed (Vwhfl, Vwhfr, Vwhrl, Vwhrr) of each of the left front wheel, the right front wheel, the left rear wheel and the right rear wheel through use of the rotation-related value and the calculated correction value, the first condition being satisfied when coupling torque information on the coupling torque of the coupling device controlled by the coupling controller indicates that the degree of transmission of the driving force to the left rear wheel axle and the right rear wheel axle is smaller than a predetermined degree; and a vehicle behavior stabilization controller (70) configured to: calculate an indicator value (SAi, SBi) indicative of an instability of a behavior of the vehicle based on the wheel speed for each of the left front wheel, the right front wheel, the left rear wheel and the right rear wheel, and perform vehicle behavior stabilization control for controlling the braking device in response to the calculated indicator value to stabilize the behavior of the vehicle.

As described above, in a situation in which the related-art vehicle travels in the four-wheel-drive state on the road surface having the low friction coefficient μ, the rotation speeds of the rear wheels are higher than those of the front wheels because the rear wheels slip. When the related-art control device calculates the correction coefficient (correction value) in the above-mentioned situation, there arises a problem that the related-art control device cannot appropriately obtain the correction coefficient in accordance with the difference in the wheel diameter. In view of this, the control apparatus according to one embodiment calculates the correction value (Ki) for the wheel speed of each of the left front wheel, the right front wheel, the left rear wheel and the right rear wheel when the coupling torque information on the coupling torque of the coupling device indicates that the degree of transmission of the driving force to the left rear wheel axle and the right rear wheel axle is smaller than the predetermined degree. When the degree of transmission of the driving force to the left rear wheel axle and the right rear wheel axle is smaller than the predetermined degree, this means that the vehicle does not travel substantially in the four-wheel-drive state. It is estimated that the rear wheels are not slipping even in the situation in which the vehicle travels on the road surface having the low friction coefficient μ. Therefore, the control apparatus can obtain the correction value appropriately in accordance with the difference in the wheel diameter.

On and after the correction value is calculated as described above, the control apparatus calculates the wheel speed of each of the left front wheel, the right front wheel, the left rear wheel and the right rear wheel through use of the rotation-related value and the calculated correction value. Therefore, the influence of the difference in the wheel diameter on the wheel speed can be reduced. Further, the control apparatus can more accurately calculate the indicator value indicative of the instability of the behavior of the vehicle based on the vehicle speed corrected by using the correction value. Accordingly, the control apparatus can more accurately detect the instability of the behavior of the vehicle to thereby perform the vehicle behavior stabilization control at an appropriate timing.

In one aspect of the control apparatus of one embodiment, the coupling device includes: a first coupling device (361) configured to control a first coupling torque (CuRL) between a driving force output part (353) of the rear wheel final gear device and the left rear wheel axle to change a degree of transmission of the driving force to the left rear wheel axle; and a second coupling device (362) configured to control a second coupling torque (CuRR) between the driving force output part and the right rear wheel axle to change a degree of transmission of the driving force to the right rear wheel axle.

Further, the wheel speed calculation controller is configured to use information ($C2_{now}$) on the first coupling torque and information ($C2_{now}$) on the second coupling torque as the coupling torque information.

The coupling device according to this aspect controls the first coupling torque of the first coupling device and the second coupling torque of the second coupling device to thereby change the degree of transmission of the driving force to the left rear wheel axle and the degree of transmission of the driving force to the right rear wheel axle independently of each other (individually). For the coupling device having the above configuration, the wheel speed calculation controller according to this aspect can determine whether or not the first condition is satisfied based on the information on the first coupling torque and the information on the second coupling torque.

In one aspect of the control apparatus of one embodiment, the coupling device includes a clutch device (400) provided between the propeller shaft and the rear wheel final gear device, and configured to control a clutch transmission force between the propeller shaft and the rear wheel final gear device to change a degree of transmission of the driving force to the left rear wheel axle and the right rear wheel axle.

Further, the wheel speed calculation controller is configured to use information ($C3_{now}$) on the clutch transmission force of the clutch device as the coupling torque information.

The coupling device according to this aspect can change the degree of transmission of the driving force to the left rear wheel axle and the right rear wheel axle at a position between the propeller shaft and the rear wheel final gear device. For the coupling device having the above configuration, the wheel speed calculation controller can determine whether or not the first condition is satisfied based on the information on the clutch transmission force of the clutch device.

In one aspect of the control apparatus of one embodiment, the wheel speed calculation controller is configured to determine that the first condition is satisfied when a state of the vehicle is a two-wheel-drive state in which the degree of transmission of the driving force to the left rear wheel axle and the right rear wheel axle is zero.

When the state of the vehicle is the two-wheel-drive state, the driving force transmitted to the left rear wheel axle and the right rear wheel axle is zero, and therefore, the rear wheels do not slip. The wheel speed calculation controller according to this aspect calculates the correction value in the above-mentioned situation to thereby obtain/acquire the correction value appropriately in accordance with the difference in the wheel diameter.

In one aspect of the control apparatus of one embodiment, the wheel speed calculation controller is configured to calculate the correction value (Ki) based on the rotation-related value when a second condition is satisfied in addition to the first condition (S210: Yes, S215: Yes), the second condition being satisfied when the traveling state information indicates that the vehicle is traveling straight, and a magnitude of an acceleration of the vehicle is smaller than a predetermined threshold.

In a situation in which the vehicle is turning, a difference occurs between the rotation-related value of the wheel on an inner side with respect to the turn of the vehicle and the rotation-related value of the wheel on an outer side with respect to the turn of the vehicle. In this situation, there is a possibility that the correction value cannot be appropriately calculated in accordance with the difference in the wheel diameter. Further, in a situation in which the vehicle is accelerating, the wheel may slip. In view of this, the wheel speed calculation controller according to this aspect calculates the correction value when the vehicle is traveling straight, and the magnitude of the acceleration of the vehicle is smaller than the predetermined threshold. Therefore, the control apparatus according to this aspect can calculate the correction value for each wheel speed more accurately.

According to one or more embodiments, one or more of the above-mentioned controllers may be implemented by a microprocessor programmed for performing one or more operations and/or functionality described herein. According to one or more embodiments, one or more of the above-mentioned controllers may be implemented, in whole or in part, by specifically configured to hardware (e.g., by one or more application specific integrated circuits or ASIC(s)).

In the above description, in order to facilitate understanding of the above one or more aspect of the control apparatus, a name and/or reference numeral used in embodiments described below is enclosed in parentheses and assigned to each of the constituent features corresponding to the embodiments. However, each of the constituent features is not limited to the embodiments defined by the name and/or reference numeral.

DETAILED DESCRIPTION

Now, referring to the accompanying drawings, a description is given of one or more embodiments. The accompanying drawings are illustrations of one or more specific embodiments, but those illustrations are examples to be used for the understanding of the embodiment(s), and are not to be used to limit the interpretation of the present disclosure.

First Embodiment

Figure 1:
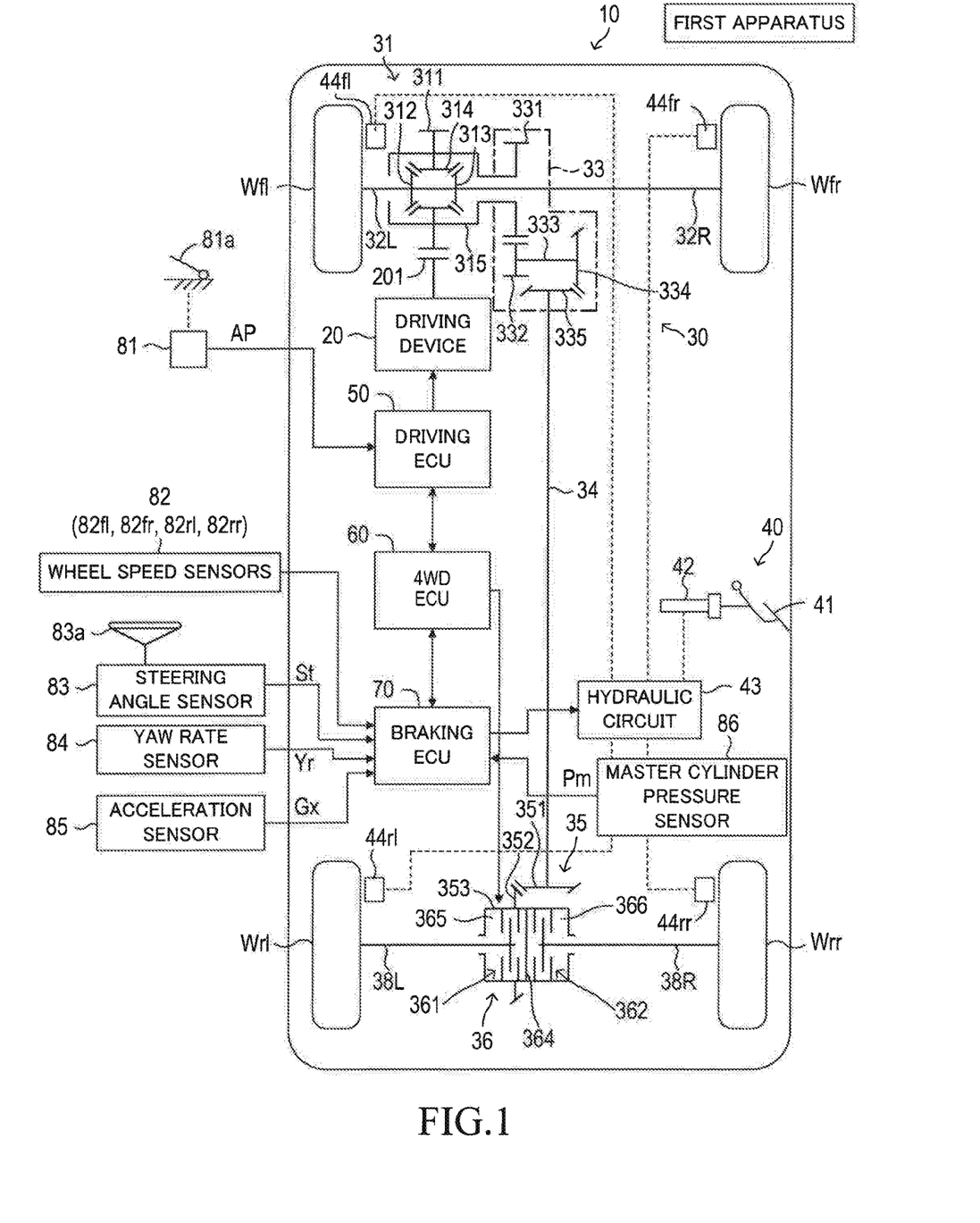
FIG. 1 is a schematic configuration diagram of a control apparatus according to a first embodiment, and a vehicle to which is the control apparatus is applied.

As illustrated in FIG. 1, a control apparatus (hereinafter, referred to as a "first apparatus") according to a first embodiment of the present disclosure is applied to a four-wheel-drive vehicle 10.

The vehicle 10 includes a driving device 20, a driving force transmitting device 30, a braking device 40, a driving ECU 50, a 4WD ECU 60, and a braking ECU 70. The driving ECU 50, the 4WD ECU 60 and the braking ECU 70 correspond to a part of the control apparatus according to the present disclosure. In addition, two or more ECUs among the above-mentioned ECUs may be integrated into one ECU.

The above-mentioned ECUs are electric control units each including a microcomputer as a main part, and are connected to one another so as to be able to mutually transmit and receive information via a controller area network (CAN) (not shown). The microcomputer herein includes a CPU, a RAM, a ROM, a nonvolatile memory, an interface I/F, and the like. The CPU executes instructions (programs and routines) stored in the ROM to realize various functions described later.

The driving device 20 generates a driving force. The driving device 20 drives wheels of the vehicle 10 (a left front wheel Wfl, a right front wheel Wfr, a left rear wheel Wrl and a right rear wheel Wrr) through the driving force transmitting device 30. The driving device 20 includes a combination of an engine and a transmission for a typical vehicle. The driving device 20 may include any one of driving devices for vehicle which are well known in the art, such as a combination of an electric motor and a transmission, as well as a combination of an engine, an electric motor and a transmission.

The driving force transmitting device 30 includes a front wheel differential device 31, a left front wheel axle 32L, a right front wheel axle 32R, a transfer gear device 33, a propeller shaft 34, a rear wheel final gear device 35, a clutch device 36, a left rear wheel axle 38L, a right rear wheel axle 38R, and the like.

The front wheel differential device 31 includes a drive gear 311, a left side gear 312, a right side gear 313, a pinion gear 314, and a front differential case 315. The drive gear 311 engages with a transmission output gear 201 which outputs the driving force generated by the driving device 20. The left side gear 312 is directly coupled to the left front wheel axle 32L, and rotates integrally with the left front wheel axle 32L. The right side gear 313 is directly coupled to the right front wheel axle 32R, and rotates integrally with the right front wheel axle 32R. The left side gear 312 and the right side gear 313 are coupled by the pinion gear 314. The front differential case 315 is directly coupled to the drive gear 311, and rotates integrally with the drive gear 311. Further, the front differential case 315 accommodates the left side gear 312, the right side gear 313, and the pinion gear 314. With such a configuration, the front wheel differential device 31 transmits the driving force generated by the driving device 20 to the left front wheel axle 32L and the right front wheel axle 32R, and distributes the driving force to the left front wheel axle 32L and the right front wheel axle 32R while allowing for differential between those front wheel axles.

The transfer gear device 33 includes an input gear 331, a counter gear 332, a counter shaft 333, a first ring gear 334, and a first pinion gear 335. The input gear 331 is directly coupled to the front differential case 315, and rotates integrally with the front differential case 315. The counter gear 332 engages with the input gear 331. One end of the counter shaft 333 is coupled to the counter gear 332, and the other end of the counter shaft 333 is coupled to the first ring gear 334. Therefore, the first ring gear 334 rotates integrally with the counter gear 332. The first pinion gear 335 engages with the first ring gear 334. The first pinion gear 335 is coupled to a front end of the propeller shaft 34, and rotates integrally with the propeller shaft 34. The first pinion gear 335 and the first ring gear 334 constitute a so-called hypoid gear in which the first pinion gear 335 engages with the first ring gear 334 in such a manner that an axial center of the first pinion gear 335 is offset from a rotation center of the first ring gear 334. With such a configuration, the transfer gear device 33 transmits the driving force to the rear wheel side via the propeller shaft 34.

The rear wheel final gear device 35 includes a second pinion gear 351, a second ring gear 352, a rear differential case 353, and the like. The second pinion gear 351 is coupled to a rear end of the propeller shaft 34, and rotates integrally with the propeller shaft 34. The second ring gear 352 engages with the second pinion gear 351. The rear differential case 353 is a cylindrical case arranged coaxially with the left rear wheel axle 38L and the right rear wheel axle 38R, and is directly coupled to the second ring gear 352. Therefore, the rear differential case 353 is configured to rotate integrally with the second ring gear 352 around the left rear wheel axle 38L and the right rear wheel axle 38R. The second pinion gear 351 and the second ring gear 352 constitute a hypoid gear. The rear differential case 353 will be also referred to as a "driving force output part". With such a configuration, the rear wheel final gear device 35 transmits the driving force from the propeller shaft 34 to the left rear wheel axle 38L and the right rear wheel axle 38R.

In the present embodiment, a final gear ratio on the side of the rear wheels (that is, the left rear wheel Wrl and the right rear wheel Wrr) is set to be smaller than a final gear ratio on the side of the front wheels (that is, the left front wheel Wfl and the right front wheel Wfr). For example, a final gear ratio of the front wheel differential device 31 and a final gear ratio of the rear wheel final gear device 35 are set in such a manner that wheel rotation speeds of the rear wheels Wrl and Wrr are increased by 2% to 5% compared to wheel rotation speeds of the front wheels Wfl and Wfr.

The clutch device 36 includes a first clutch 361 and a second clutch 362. The first clutch 361 is arranged between the rear wheel final gear device 35 and the left rear wheel axle 38L. The first clutch 361 controls a transmission torque between the rear differential case 353 and the left rear wheel axle 38L to change a transmission degree of the driving force to the left rear wheel axle 38L. The second clutch 362 is arranged between the rear wheel final gear device 35 and the right rear wheel axle 38R. The second clutch 362 controls a transmission torque between the rear differential case 353 and the right rear wheel axle 38R to change a transmission degree of the driving force to the right rear wheel axle 38R. The first clutch 361 and the second clutch 362 are independently-variable-control-type clutches configured to independently change the transmission torque based on a command (including a target value) from the 4WD ECU 60, respectively. The above-mentioned transmission torque will be also referred to as a "coupling torque". Further, the first clutch 361 and the second clutch 362 are also referred to as a "first coupling device 361" and a "second coupling device 362", respectively. A partition wall 364 is provided at a central portion of the rear differential case 353 in an axial direction (right and left direction of the vehicle). A first clutch chamber 365 is formed on the left side of the vehicle with respect to the partition wall 364, and a second clutch chamber 366 is formed on the right side of the vehicle with respect to the partition wall 364. The first clutch 361 is accommodated in the first clutch chamber 365, and the second clutch 362 is accommodated in the second clutch chamber 366. The configuration of the clutch device 36 is well known as described in Japanese Patent Application Laid-Open No. 2007-45194 A, which is hereby incorporated by reference into this application. Each of the first clutch 361 and the second clutch 362 is a clutch in which a multiple disk type clutch and an electromagnetic clutch are combined.

The braking device 40 includes a brake pedal 41, a master cylinder 42, a hydraulic circuit 43, wheel cylinders 44 (44fl, 44fr, 44rl and 44rr), and the like. The hydraulic circuit 43 includes a reservoir (not shown), an oil pump (not shown), various valve devices (not shown) and the like, and functions as a brake actuator. The braking force of each of the left front wheel Wfl, the right front wheel Wfr, the left rear wheel Wrl and the right rear wheel Wrr is controlled by controlling a braking pressure of the corresponding wheel cylinder (44fl, 44fr, 44rl, 44rr) through the operation of the hydraulic circuit 43 of the braking device 40.

The driving ECU 50 is electrically connected to various sensors including an accelerator pedal operation amount sensor 81, and is configured to receive output signals from those sensors. The accelerator pedal operation amount sensor 81 is configured to generate an output signal indicative of a depression amount (hereinafter, also referred to an "accelerator opening") AP of an accelerator pedal 81a configured to be operated by the driver. The driving ECU 50 is electrically connected to the driving device 20. The driving ECU 50 is configured to transmit various signals for controlling the driving device 20 based on the depression amount AP of the accelerator pedal 81a and an operation state of a shift lever (not shown).

Although not illustrated in FIG. 1, the 4WD ECU 60 is electrically connected to wheel speed sensors 82 (82fl, 82fr, 82rl and 82rr), a steering angle sensor 83, a yaw rate sensor 84 and an acceleration sensor 85, and is configured to receive output signals from those sensors. Each of the wheel speed sensors 82 is configured to generate one pulse each time the corresponding wheel rotates by a predetermined angle. The steering angle sensor 83 is configured to generate an output signal indicative of a steering angle St of a steering wheel 83a configured to be operable by the driver. The yaw rate sensor 84 is configured to generate an output signal indicative of a yaw rate Yr of the vehicle 10. The acceleration sensor 85 is configured to generate an output signal indicative of an acceleration Gx in a front and rear direction of the vehicle 10 (direction along a central axis extending in the front and rear direction of the vehicle 10). In addition, the steering angle sensor 83 and the yaw rate sensor 84 detect the steering angle St and the yaw rate Yr, respectively, in such a manner that each of the sensors generates a positive value when the vehicle 10 is turning left.

Hereinafter, "information on a traveling state of the vehicle 10" output from the wheel speed sensors 82, the steering angle sensor 83, the yaw rate sensor 84 and the acceleration sensor 85 will be also referred to as "traveling state information".

Further, the 4WD ECU 60 is electrically connected to the rear wheel final gear device 35 and the clutch device 36, and is configured to control a first coupling torque CuRL of the first clutch 361 and a second coupling torque CuRR of the second clutch 362. Specifically, the 4WD ECU 60 transmits an instruction value (target value) C1 of the first coupling torque CuRL to the first clutch 361. The first clutch 361 changes the first coupling torque CuRL so that the first coupling torque CuRL matches (becomes equal to) the instruction value C1. The 4WD ECU 60 transmits an instruction value (target value) C2 of the second coupling torque CuRR to the second clutch 362. The second clutch 362 changes the second coupling torque CuRR so that the second coupling torque CuRR matches (becomes equal to) the instruction value C2. Further, the 4WD ECU 60 outputs the instruction value C1 of the first coupling torque CuRL and the instruction value C2 of the second coupling torque CuRR to the braking ECU 70.

Hereinafter, the instruction value C1 of the first coupling torque CuRL and the instruction value C2 of the second coupling torque CuRR are also collectively referred to as "coupling information".

The 4WD ECU 60 is electrically connected to a driving state switch (not shown). The position of the driving state switch is configured to be changed by the driver to any one of a two-wheel-drive selection position, a four-wheel-drive selection position, and an automatic control selection position.

When the position of the driving state switch is in the two-wheel-drive selection position, the 4WD ECU 60 sets the instruction value C1 and the instruction value C2 to a minimum value (in this example, "0"). Thus, the vehicle 10 travels in the two-wheel-drive state.

When the position of the driving state switch is in the four-wheel-drive selection position, the 4WD ECU 60 sets the instruction value C1 and the instruction value C2 to a maximum value. Thus, the vehicle 10 travels in the four-wheel-drive state.

When the position of the driving state switch is in the automatic control selection position, the 4WD ECU 60 changes the instruction values C1 and C2 based on the traveling state information, respectively, to thereby improve traveling performance of the vehicle 10.

For example, when the vehicle 10 is turning, the 4WD ECU 60 changes the instruction values C1 and C2 based on the traveling state information as described below.

(At Time of Turning Left)

When the steering angle St is equal to or larger than a positive steering angle threshold, and the vehicle speed (for example, an average value of wheel speeds Vwhfl, Vwhfr, Vwhrl and Vwhrr describer later) is equal to or higher than a predetermined speed threshold, the 4WD ECU 60 sets the instruction value C1 to "0", and sets the instruction value C2 to a predetermined positive value (in some cases, a maximum value). Therefore, a yaw movement in a left turning direction can be generated on the vehicle 10 to thereby improve turning performance of the vehicle 10.

(At Time of Turning Right)

When the steering angle St is equal to or smaller than a negative steering angle threshold, and the vehicle speed (for example, the average value of the wheel speeds Vwhfl, Vwhfr, Vwhrl and Vwhrr) is equal to or higher than the predetermined speed threshold, the 4WD ECU 60 sets the instruction value C2 to "0", and sets the instruction value C1 to the predetermined positive value (in some cases, the maximum value). Therefore, a yaw movement in a right turning direction can be generated on the vehicle 10 to thereby improve turning performance of the vehicle 10.

The above-mentioned control in the case of the automatic control selection position is an example, and is not limited to this example. The 4WD ECU 60 may change the instruction value C1 and the instruction value C2 in accordance with the traveling state information other than the "steering angle and vehicle speed" described above.

The braking ECU 70 is electrically connected to the wheel speed sensors 82 (82*fl*, 82*fr*, 82*rl* and 82*rr*), the steering angle sensor 83, the yaw rate sensor 84, and the acceleration sensor 85, and is configured to receive the above-mentioned output signals from those sensors.

The braking ECU 70 counts the number of pulses generated by the wheel speed sensor 82 per unit time to calculate a rotation speed (wheel angular velocity) of the wheel provided with that wheel speed sensor 82 based on the counted value.

The braking ECU 70 calculates a wheel speed Vwi (circumferential velocity of wheel) according to the following Expression (1). In Expression (1), "ri" is a dynamic radius of the wheel (tire), "ωi" is the rotation speed of the wheel (angular velocity of the wheel), "N" is the number of teeth of a rotor (number of pulses generated per rotation of the rotor), and "Pi" is the number of pulses counted per unit time (measurement time) ΔT. The number of pulses Pi is a value associated with the rotation speed of the wheel, and may be hereinafter referred to as a "rotation-related value". In the following description, a suffix "i" represents any one of "fl, fr, rl, and rr". "fl" corresponds to the left front wheel Wfl, "fr" corresponds the right front wheel Wfr, "rl" corresponds to the left rear wheel Wrl, and "rr" corresponds to the right rear wheel Wrr.

$$Vwi = ri \cdot \omega i = ri \cdot (2 \cdot \pi / N) \cdot (Pi / \Delta T) \quad (1)$$

As described above, due to the difference in the degree of abrasion between the tires of the wheels (Wfl, Wfr, Wrl, and Wrr) and/or the difference in the air pressure between the tires, a situation may occur in which the wheel diameters differ from each other. In view of this, the braking ECU 70 corrects the wheel speed Vwi through use of a correction coefficient Ki under predetermined conditions described below. Therefore, it is possible to reduce the influence of the difference in the wheel diameter on the calculation of the wheel speed. Hereinafter, the "correction coefficient" may be referred to as a "correction value".

The braking ECU 70 calculates the correction coefficient Ki for each wheel Wi according to the following Expression (2). The correction coefficient Ki is calculated by a ratio between the number of pulses Pi of the wheel Wi per unit time, and an average value of the values Pfl, Pfr, Prl and Prr of all wheels. In other words, the correction coefficient Ki of a certain wheel Wi is a ratio of an "average value of the rotation speeds (angular velocities) of the four wheels (all wheels)" to the "rotation speed (angular velocity) of that wheel Wi".

$$Ki = \{(Pfl + Pfr + Prl + Prr)/4\}/Pi \quad (2)$$

Further, according to the following Expression (3), the braking ECU 70 corrects the wheel speed Vwi by multiplying the wheel speed Vwi calculated according to the Expression (1) by the correction coefficient Ki. In this manner, the braking ECU 70 calculates a final wheel speed Vwhi for each wheel.

$$Vwhi = Ki \times Vwi \quad (3)$$

In the above manner, the braking ECU 70 calculates a wheel speed Vwhfl of the left front wheel Wfl, a wheel speed Vwhfr of the right front wheel Wfr, a wheel speed Vwhrl of the left rear wheel Wrl, and a wheel speed Vwhrr of the right rear wheel Wrr.

In addition, when predetermined conditions described later are not satisfied, the braking ECU 70 adopts the wheel speed Vwi as the final wheel speed Vwhi.

The braking ECU 70 is electrically connected to a master cylinder pressure sensor 86, and is configured to receive an output signal from that sensor. The master cylinder pressure sensor 86 is configured to generate an output signal indicative of a pressure Pm (hereinafter, referred to as "master cylinder pressure") of the master cylinder 42 driven in response to a depression operation of the brake pedal 41 by the driver.

Under normal conditions, the braking ECU 70 controls the hydraulic circuit 43 based on the master cylinder pressure Pm to control/adjust braking pressures of the wheel cylinders (44fl, 44fr, 44rl, and 44rr) corresponding to the wheels (Wfl, Wfr, Wrl, and Wrr). Meanwhile, in "anti-lock braking control or traction control" describer later, the braking ECU 70 controls the hydraulic circuit 43 to control/adjust the braking pressures of the wheel cylinders (44fl, 44fr, 44rl, and 44rr) corresponding to the wheels (Wfl, Wfr, Wrl, and Wrr) independently of each other (individually).

<Overview of Anti-Lock Brake System (ABS)>

The braking ECU 70 is configured to perform anti-lock brake control for canceling a locked state of the wheel (Wfl, Wfr, Wrl or Wrr) at the time of braking the vehicle 10. The anti-lock brake control is well known, and therefore, it will be briefly described below. Hereinafter, this control is simply referred to as "ABS control".

The braking ECU 70 calculates a slip ratio SAi for each wheel Wi based on the wheel speed Vwhi every time a predetermined time elapses. For example, the slip ratio SAi is one of various indicator values (index values) indicative of an instability of a behavior of the vehicle 10, and is obtained according to the following Expression (4). "Va" is a reference speed, for example, a speed of a vehicle body estimated from the four wheel speeds Vwhi.

$$SAi=((Va-Vwhi)/Va)\times 100\% \quad (4)$$

When the slip ratio SAi exceeds a predetermined ABS start threshold Th_abs (threshold for determining whether to start the ABS control) during braking of the vehicle 10, the braking ECU 70 determines that the wheel is in the locked state. The braking ECU 70 determines the "wheel Wi of which the slip ratio SAi has exceeded the ABS start threshold Th_abs" as a "ABS target wheel". Therefore, the braking ECU 70 starts the ABS control on the ABS target wheel Wi. The braking ECU 70 controls the hydraulic circuit 43 to decrease the braking pressure of the wheel cylinder 44i corresponding to the ABS target wheel Wi. The braking force applied to the ABS target wheel Wi is decreased, and as a result, the slip ratio SAi of the ABS target wheel Wi is gradually decreased. Thereafter, the braking ECU 70 repeatedly executes increasing and decreasing of the braking pressure of the wheel cylinder 44i corresponding to the ABS target wheel Wi. When a predetermined ABS termination condition is satisfied, the braking ECU 70 terminates the ABS control. For example, the ABS termination condition is satisfied when the slip ratio SAi of the ABS target wheel Wi becomes equal to or smaller than a predetermined ABS termination threshold.

<Overview of Traction Control (TRC)>

The braking ECU 70 is configured to perform traction control for suppressing the slip of the wheel (driving wheel) during acceleration of the vehicle 10 (including a start of the travel of the vehicle 10). The traction control is well known, and therefore, it will be briefly described below. Hereinafter, this control is simply referred to as "TRC control". "Slip of the wheel" includes a case in which the wheel is lifted from the road surface and a case in which the wheel enters a slip state on a road surface.

The braking ECU 70 calculates a slip ratio SBi for each wheel Wi based on the wheel speed Vwhi every time a predetermined time elapses. For example, the slip ratio SBi is obtained according to the following Expression (5). As described above, "Va" is the reference speed, for example, a speed of the vehicle body estimated from the four wheel speeds Vwhi.

$$SBi=((Vwhi-Va)/Va)\times 100\% \quad (5)$$

When the slip ratio SBi of the driving wheel exceeds a predetermined TRC start threshold Th_trc (threshold for determining whether to start the TRC control) during acceleration of the vehicle 10, the braking ECU 70 determines that the driving wheel is slipping. The braking ECU 70 determines the "driving wheel Wi which is determined to be slipping" as a "TRC target wheel". Therefore, the braking ECU 70 starts the TRC control on the TRC target wheel Wi. The braking ECU 70 controls the hydraulic circuit 43 to increase the braking pressure of the wheel cylinder 44i corresponding to the TRC target wheel Wi. The braking force is applied to the TRC target wheel Wi, and as a result, the slip ratio SBi of the TRC target wheel Wi is gradually decreased. Thereafter, the braking ECU 70 repeatedly executes increasing and decreasing of the braking pressure of the wheel cylinder 44i corresponding to the TRC target wheel Wi. When a predetermined TRC termination condition is satisfied, the braking ECU 70 terminates the TRC control. For example, the TRC termination condition is satisfied when the slip ratio SBi of the TRC target wheel Wi becomes equal to or smaller than a predetermined TRC termination threshold.

Hereinafter, the ABS control and the TRC control may be collectively referred to as "vehicle behavior stabilization control".

<Overview of Operation>

In a situation in which the vehicle 10 is traveling in the four-wheel-drive state on a road surface having a low friction coefficient μ, it is assumed that the braking ECU 70 calculates the correction coefficient Ki for each of the wheels Wi. In such a case, since the rear wheels rotate while slipping on the road surface due to the difference in the final gear ratio between the front wheels and the rear wheels, the rotation speeds of the rear wheels are higher than those of the front wheels. A case may arise that the correction coefficients (Kfl, Kfr) for the respective wheel speeds (Vwfl, Vwfr) of the front wheels (Wfl, Wfr) become values larger than "1", and the correction coefficients (Krl, Krr) for the respective wheel speeds (Vwrl, Vwrr) of the rear wheels (Wrl, Wrr) become values smaller than "1". Therefore, in a situation in which the vehicle 10 travels in the four-wheel-drive state, there is a possibility that the braking ECU 70 cannot calculate the correction coefficients Ki appropriately in accordance with the difference in the wheel diameter.

In view of the above, the braking ECU 70 of the first apparatus calculates the correction coefficients Ki in a state in which the coupling information (i.e., the instruction values C1 and C2) indicates that a degree of transmission of the driving force to the left rear wheel axle 38L and the right rear wheel axle 38R is smaller than a predetermined degree. Hereinafter, the "state in which the degree of transmission of the driving force to the left rear wheel axle 38L and the right rear wheel axle 38R is smaller than the predetermined degree" is referred to as a "specific state". In addition, when the degree of transmission of the driving force to the left rear wheel axle 38L and the right rear wheel axle 38R is zero (or a value close to zero), the driving force to be transmitted to the left rear wheel axle 38L and the right rear wheel axle 38R becomes substantially zero. In this case, the specific state corresponds to the above-mentioned "two-wheel-drive state".

In a situation in which the vehicle 10 travels in the specific state, the degree of transmission of the driving force to the rear wheel side (that is, the left rear wheel axle 38L and the right rear wheel axle 38R) is small. This means that the vehicle 10 does not travel substantially in the four-wheel-drive state. In this situation, it can be estimated that the rear wheels (Wrl, Wrr) are not slipping. Therefore, it can be estimated that the difference in the rotation speed (angular velocity) between the wheels is due to the difference in the wheel diameter between those wheels. In such a situation in which the vehicle 10 travels in the specific state, the braking ECU 70 calculates the correction coefficients Ki to thereby obtain the correction coefficients Ki appropriately according to the difference in the wheel diameter.

Specifically, the braking ECU 70 determines whether or not the vehicle 10 travels in the specific state based on the current instruction value C1 of the first coupling torque CuRL and the current instruction value C2 of the second coupling torque CuRR. When determining that the vehicle 10 travels in the specific state, the braking ECU 70 calculates the correction coefficients Ki for the wheels Wi. Further, on and after the correction coefficients Ki are calculated as described above, the braking ECU 70 determines whether or not the vehicle 10 travels in the specific state. When determining that the vehicle 10 travels in the specific state, the braking ECU 70 multiplies the wheel speeds Vwi by their corresponding correction coefficients Ki, respectively, to thereby correct the wheel speeds Vwi.

<Operation>

Figure 2:
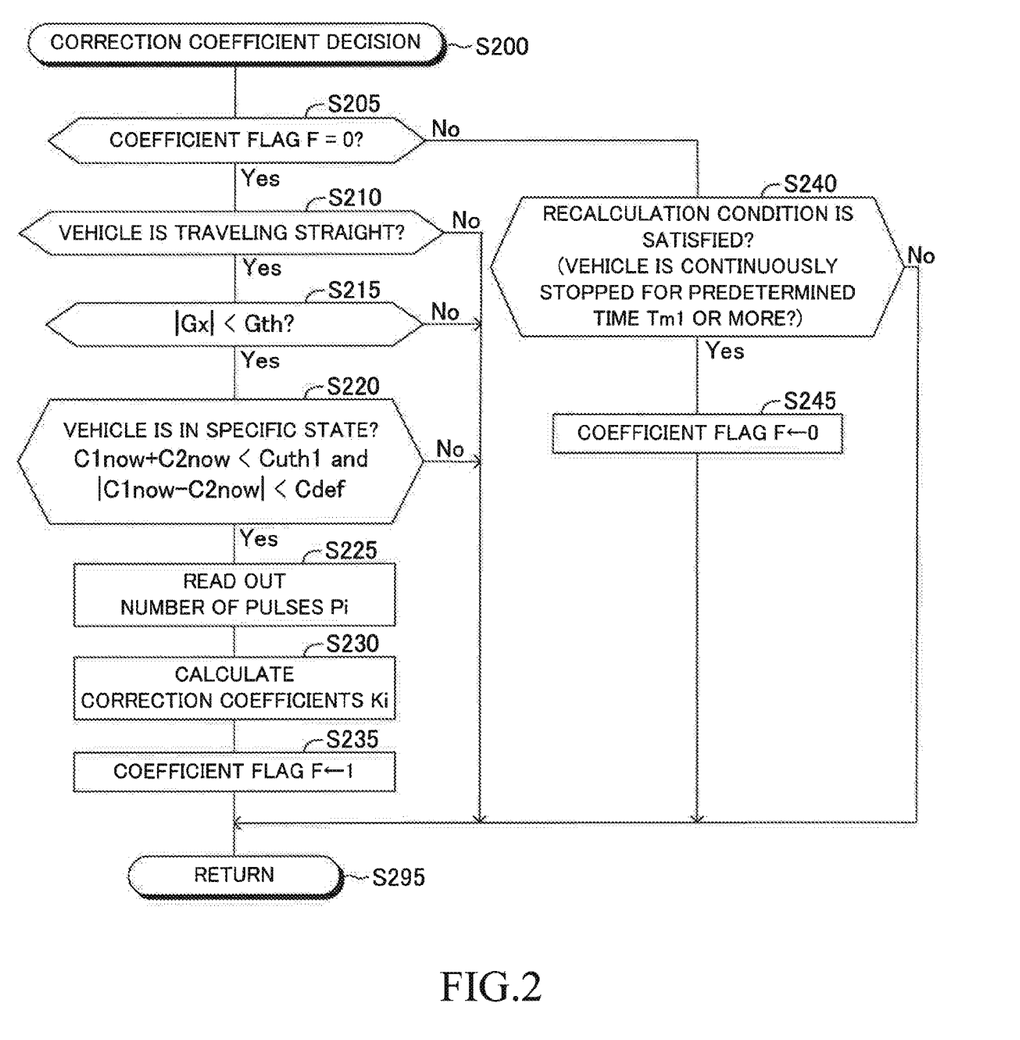
FIG. 2 is a flowchart for illustrating a "correction coefficient decision routine" to be executed by a CPU of a braking ECU.

Next, an operation of the CPU of the braking ECU 70 (hereinafter, simply referred to as the "CPU") will be described. The CPU is configured or programmed to execute a "correction coefficient decision routine" of FIG. 2 shown by a flowchart every time a predetermined period of time elapses. Further, the CPU execute a routine (not shown) to acquire the traveling state information from the wheel speed sensors 82, the steering angle sensor 83, the yaw rate sensor 84 and the acceleration sensor 85.

In addition, when an ignition switch (not shown) is changed from an off-state to an on-state, the CPU executes an initialization routine (not shown) to set the correction coefficients Ki to a predetermined initial value (for example, "1"). Hereinafter, the ignition switch is referred to as "IG switch". The values of the correction coefficients Ki are stored in the RAM of the braking ECU 70. Further, when the IG switch is in the on-state, the CPU executes a routine (not shown) to measure the number of pulses Pi per unit time $\Delta T$ for each wheel Wi, and stores data on the number of pulses Pi in the RAM.

As a predetermined timing arrives, the CPU starts the routine of FIG. 2 from Step S200, and proceeds to Step S205 to determine whether or not a value of a coefficient flag F is "0". When the value of the coefficient flag F is "0", this indicates that the correction coefficients Ki for any of the wheels have not yet been calculated (that is, all the correction coefficients Ki remain at the initial value). When the value of the coefficient flag F is "1", this indicates that the correction coefficients Ki for all wheels have already been calculated. The value of the coefficient flag F is set to "0" in the above-mentioned initialization routine. The value of the coefficient flag F is also set to "0" in Step S245 described later.

It is assumed that the value of the coefficient flag F is "0". In this case, the CPU makes a "Yes" determination in Step S205, and proceeds to Step S210 to determine whether or not the vehicle 10 is traveling substantially straight based on the traveling state information. When the following Expression (6) is satisfied (that is, a magnitude of the steering angle St is smaller than δo), the CPU determines that the vehicle 10 is traveling substantially straight. Here, "St" is the steering angle of the steering wheel 83a, and "δo" is a predetermined angle (threshold).

$$|St| < \delta o \tag{6}$$

In one or more embodiments, the CPU may determine whether or not the vehicle 10 is traveling substantially straight based on the rotation-related values Pi for the wheels or the rotation speeds (angular velocities) calculated from those rotation-related values Pi. In one or more embodiments, the CPU may determine that the vehicle 10 is traveling substantially straight when a magnitude of the yaw rate Yr is smaller than a predetermined yaw rate threshold Yrth. In one or more embodiments, the CPU may determine that the vehicle 10 is traveling substantially straight when a difference between the rotation speed of the left front wheel Wfl and the rotation speed of the right front wheel Wfr is smaller than a predetermined rotation difference threshold.

When Expression (6) is not satisfied, the CPU makes a "No" determination in Step S210, and proceeds directly to Step S295 to tentatively terminate this routine. When Expression (6) is not satisfied, this means that the vehicle 10 is turning. When the vehicle 10 is turning, a difference occurs between the rotation-related value Pi of the wheel on the inner side with respect to the turn of the vehicle 10 and the rotation-related value Pi of the wheel on the outer side with respect to the turn of the vehicle 10. The CPU may not appropriately calculate the correction coefficients Ki in accordance with the difference in the wheel diameter. Therefore, when Expression (6) is not satisfied, the CPU does not calculate the correction coefficients Ki.

On the other hand, assuming that the vehicle 10 is traveling straight, the CPU makes a "Yes" determination in Step S210, and proceeds to Step S215 to determine whether or not the following Expression (7) is satisfied. Here, "Gth" is a predetermined acceleration threshold.

$$|Gx| < Gth \tag{7}$$

When Expression (7) is not satisfied, the CPU makes a "No" determination in Step S215, and proceeds directly to Step S295 to tentatively terminate this routine. It is assumed that the driver is operating the accelerator pedal 81a, and therefore, a magnitude of the acceleration Gx is large (that is, Expression (7) is not satisfied). In such a case where the vehicle 10 is accelerating significantly, the slip of the wheel may occur. During the slip of the wheel, the CPU cannot appropriately calculate the correction coefficients Ki in accordance with the difference in the wheel diameter. Therefore, in this case, the CPU does not calculate the correction coefficients Ki.

Meanwhile, when Expression (7) is satisfied, the CPU makes a "Yes" determination in Step S215, and proceeds to Step S220 to determine whether or not the vehicle 10 is traveling in the specific state (that is, the degree of transmission of the driving force to the left rear wheel axle 38L and the right rear wheel axle 38R is smaller than the predetermined degree). The CPU determines that the vehicle 10 is traveling in the specific state when both of the following Conditions 1 and 2 are satisfied.

(Condition 1): $C1_{now} + C2_{now} < Cuth1$
(Condition 2): $|C1_{now} - C2_{now}| < Cdef$ Here, "$C1_{now}$" is the current instruction value of the first coupling torque CuRL, and "$C2_{now}$" is the current instruction value of the second coupling torque CuRR. "Cuth1" is a threshold for determining whether the degree of transmission of the driving force to the left rear wheel axle 38L and the right rear wheel axle 38R is smaller than the predetermined degree. "Cdef" is a threshold for determining whether a difference between a distribution amount of the driving force to the left rear wheel axle 38L and a distribution amount of the driving force to the right rear wheel axle 38R is smaller than a predetermined difference.

When one or both of Condition 1 and Condition 2 are not satisfied, the CPU makes a "No" determination in Step S220, and proceeds directly to Step S295 to tentatively terminate this routine. Therefore, in this case, the CPU does not calculate the correction coefficients Ki.

On the other hand, when both of Condition 1 and Condition 2 are satisfied, the CPU makes a "Yes" determination in Step S220, and sequentially executes the processing of Steps S225 to S235 describer later. Thereafter, the CPU proceeds to Step S295 to tentatively terminate this routine.

Step S225: The CPU reads out the data on the number of pulses Pi per unit time ΔT for each wheel Wi from the RAM.

Step S230: The CPU calculates the correction coefficients Ki for all the wheels Wi according to Expression (2), and stores the calculated correction coefficients Ki in the RAM.

Step S235: The CPU sets the value of the coefficient flag F to "1".

Further, when the value of the coefficient flag F is not "0" at the time point at which the CPU executes the processing of Step S205, the CPU makes a "No" determination in Step S205, and proceeds to Step S240. In Step S240, the CPU determines whether or not a predetermined recalculation condition is satisfied. Specifically, the recalculation condition is satisfied when the vehicle 10 is continuously stopped for a predetermined time Tm1 (for example, 5 minutes) or more while the IG switch is maintained in the on-state.

When the recalculation condition is not satisfied, the CPU makes a "No" determination in Step S240, and proceeds directly to Step S295 to tentatively terminate this routine.

Meanwhile, when the recalculation condition is satisfied, the CPU makes a "Yes" determination in Step S240, and proceeds to Step S245 to set the value of the coefficient flag F to "0". Thereafter, the CPU proceeds to Step S295 to tentatively terminate this routine. In this case, when the CPU again proceeds to Step S205, the CPU makes a "Yes" determination, and thus, executes the processing of Steps S210 to S235. That is, the correction coefficients Ki are recalculated.

Figure 3:
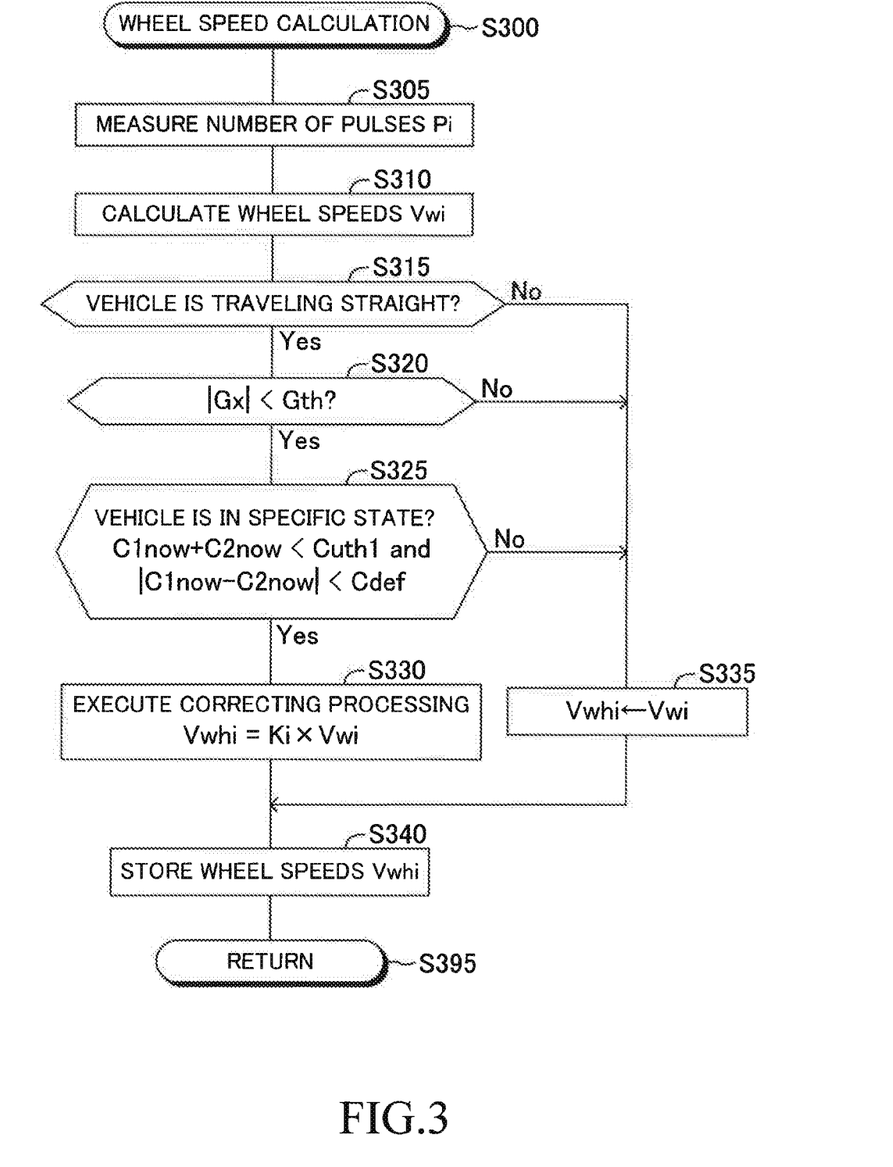
FIG. 3 is a flowchart for illustrating a "wheel speed calculation routine" to be executed by the CPU of the braking ECU.

Furthermore, the CPU is configured or programmed to execute a "wheel speed calculation routine" of FIG. 3 shown by a flowchart every time a predetermined period of time elapses.

As a predetermined timing arrives, the CPU starts the routine of FIG. 3 from Step S300, and sequentially executes the processing of Steps S305 to S310 describer later. Thereafter, the CPU proceeds to Step S315.

Step S305: The CPU reads out the data on the number of pulses Pi per unit time ΔT for each wheel Wi from the RAM.

Step S310: The CPU calculates the wheel speeds Vwi for all the wheels Wi according to Expression (1).

As the CPU proceeds to Step S315, the CPU determines whether or not the vehicle 10 is traveling substantially straight through use of Expression (6) as described above. Assuming that Expression (6) is satisfied, the CPU makes a "Yes" determination in Step S315, and proceeds to Step S320 to determine whether or not Expression (7) is satisfied.

Assuming that Expression (7) is satisfied, the CPU makes a "Yes" determination in Step S320, and proceeds to Step S325 to determine whether or not the vehicle 10 is traveling in the specific state. It is now assumed that both of Condition 1 and Condition 2 are satisfied. In this case, the CPU makes a "Yes" determination in Step S325, and sequentially executes the processing of Steps S330 and S340 describer later. Thereafter, the CPU proceeds to Step S395 to tentatively terminate this routine.

Step S330: The CPU reads out the correction coefficients from the RAM. Then, the CPU corrects the wheel speed Vwi for each wheel Wi according to Expression (3) to thereby obtain/calculate the final wheel speed Vwhi (that is, corrected wheel speed). If the correction coefficients Ki have not yet been calculated in the routine of FIG. 2 (that is, the processing of Step S230 has not yet been executed, and thus, the value of the coefficient flag F is "0"), the CPU corrects the wheel speed Vwi by using the initial value of the correction coefficient Ki for each wheel Wi. On the other hand, if the correction coefficients Ki have already been calculated in the routine of FIG. 2 (that is, the processing of Step S230 has been already executed, and thus, the value of the coefficient flag F is "1"), the CPU corrects the wheel speed Vwi through use of the corresponding correction coefficient Ki calculated in Step S230 for each wheel Wi.

Step S340: The CPU stores in the RAM the wheel speeds Vwhi for all the wheels Wi which have been calculated in the previous step S330. The wheel speeds Vwhi stored in the RAM through this step are used to calculate the slip ratio (SAi, SBi).

On the other hand, when Expression (6) is not satisfied at the time point at which the CPU proceeds to Step S315, the CPU makes a "No" determination in Step S315, and proceeds to Step S335. In addition, when Expression (7) is not satisfied at the time point at which the CPU proceeds to Step S320, the CPU makes a "No" determination in Step S320, and proceeds to Step S335. Further, when one or both of Condition 1 and Condition 2 are not satisfied at the time point at which the CPU proceeds to Step S325, the CPU makes a "No" determination in Step S325, and proceeds to Step S335. As the CPU proceeds to Step S335, the CPU adopts the wheel speeds Vwi calculated in Step S310 as the final wheel speeds Vwhi, respectively. Next, in Step S340, the CPU stores the wheel speeds Vwhi in the RAM. Thereafter, the CPU proceeds to Step S395 to tentatively terminate this routine.

As described above, the first apparatus determines whether or not the vehicle 10 is traveling substantially straight and the absolute value of the acceleration Gx is smaller than the predetermined acceleration threshold Gth. In the case where the vehicle 10 is traveling substantially straight and the absolute value of the acceleration Gx is smaller than the predetermined acceleration threshold Gth, the first apparatus determines whether or not the vehicle 10 is traveling in the specific state. When determining that the vehicle 10 is traveling in the specific state, the first apparatus calculates the correction coefficients Ki.

In a situation in which the vehicle 10 is traveling in the specific state, the degree of transmission of the driving force to the left rear wheel axle 38L and the right rear wheel axle 38R is smaller than the predetermined degree. That is, the vehicle is not traveling substantially in the four-wheel-drive state. Even if the vehicle 10 is traveling on a road surface having a low friction coefficient μ, it can be estimated that the rear wheels (Wrl and Wrr) are not slipping. Therefore, the first apparatus can appropriately obtain the correction coefficients Ki in accordance with the difference in the wheel diameter.

On and after the correction coefficients Ki have been calculated as described above, the first apparatus multiplies the wheel speeds Vwi by their corresponding calculated correction coefficient Ki, respectively, when all of the following conditions (i) to (iii) are satisfied:
(i) The vehicle 10 is traveling substantially straight;
(ii) The absolute value of the acceleration Gx is smaller than the predetermined acceleration threshold Gth; and
(iii) The vehicle 10 is traveling in the specific state.

In the above manner, the first apparatus corrects the wheel speeds Vwi to thereby obtain the final wheel speed Vwhi. Therefore, the influence of the difference in the wheel diameter on the wheel speed Vwhi can be reduced. As a result, an error between a true value of the slip ratio (SAi or SBi) and the slip ratio (SAi or SBi) calculated based on the wheel speed Vwhi can be decreased. Accordingly, the first apparatus can detect the instability of the vehicle behavior more accurately, and start and/or terminate the vehicle behavior stabilization control (including the ABS control and the TRC control) at an appropriate timing.

The condition (hereinafter, referred to as "first condition") to be determined in Step S220 in the routine of FIG. 2 and Step S325 in the routine of FIG. 3 is not limited to the above example. The first condition may be a condition for determining whether the coupling information (i.e., the instruction values C1 and C2) indicates that the degree of transmission of the driving force to each of the rear wheel axles (38L and 38R) is smaller than a predetermined degree.

For example, the first condition may be a condition satisfied when all of the following Conditions 1A, 1B and 2 are satisfied. Here, "Cuth2" is a threshold for determining whether the degree of transmission of the driving force to each of rear wheel axles (38L and 38R) is smaller than the predetermined degree. Cuth2 is smaller than Cuth1.

(Condition 1A): $C1_{now} < Cuth2$
(Condition 1B): $C2_{now} < Cuth2$
(Condition 2): $|C1_{now} - C2_{now}| < Cdef$ The following Condition 1C may be used in place of Conditions 1A and 1B. Max function is a function for selecting the larger of $C1_{now}$ and $C2_{now}$.

(Condition 1C): $Max(C1_{now}, C2_{now}) < Cuth2$

Second Embodiment

Figure 4:
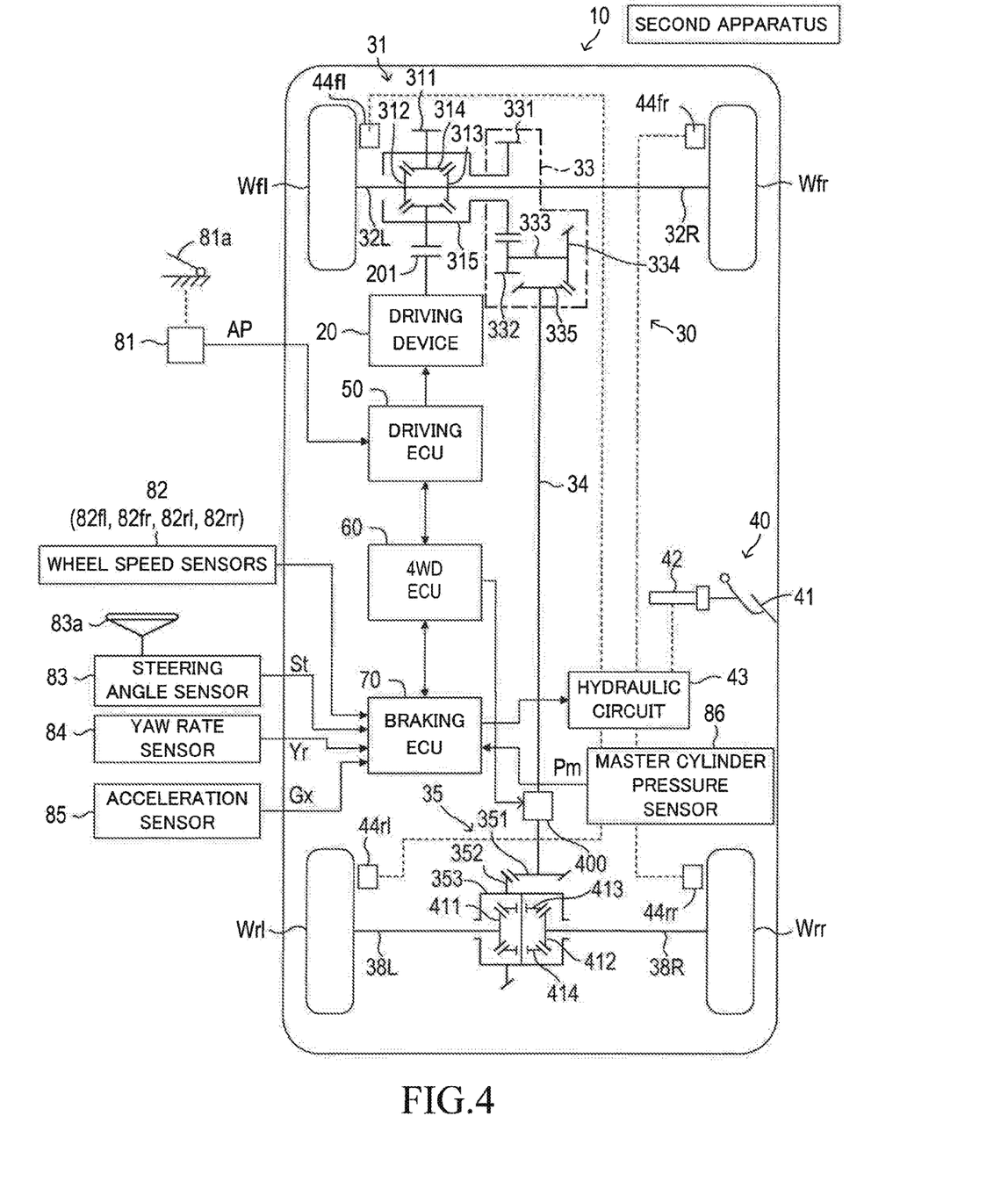
FIG. 4 is a schematic configuration diagram of a control apparatus according to a second embodiment, and a vehicle to which the control apparatus is applied.

Next, a control apparatus for a four-wheel-drive vehicle (hereinafter, referred to as a "second apparatus") according to a second embodiment will be described. The vehicle 10 to which the second apparatus is applied is different from the vehicle 10 to which the first apparatus is applied in that it includes one clutch on the rear wheel side in place of the two clutches (the first clutch 361 and the second clutch 362).

More specifically, as illustrated in FIG. 4, a clutch device 400 is provided between the propeller shaft 34 and the rear wheel final gear device 35. The clutch device 400 is a clutch in which a multiple disk type clutch and an electromagnetic clutch are combined. The clutch device 400 is configured to control a clutch transmission force between the propeller shaft 34 and the rear wheel final gear device 35 to change the degree of transmission of the driving force to the rear wheel axles (38L and 38R).

The rear differential case 353 includes a known differential configuration including a left side gear 411, a right side gear 412, a first pinion gear 413, a second pinion gear 414, and the like. The driving force transmitted to the second pinion gear 414 through the clutch device 400 is transmitted to each of the left side gear 411 and the right side gear 412 through the second ring gear 352, the rear differential case 353, the first pinion gear 413 and the second pinion gear 414. The left side gear 411 is directly connected to the left rear wheel axle 38L, and rotates integrally with the left rear wheel axle 38L. The right side gear 412 is directly connected to the right rear wheel axle 38R, and rotates integrally with the right rear wheel axle 38R. Therefore, the rear differential case 353 transmits the driving force to the left rear wheel axle 38L and the right rear wheel axle 38R, and distributes the driving force to the left rear wheel axle 38L and the right rear wheel axle 38R while allowing for differential between those rear wheel axles.

Also in the present embodiment, a final gear ratio on the side of the rear wheels (that is, the left rear wheel Wrl and the right rear wheel Wrr) is set to be smaller than a final gear ratio on the side of the front wheels (that is, the left front wheel Wfl and the right front wheel Wfr). For example, a final gear ratio of the front wheel differential device 31 and a final gear ratio of the rear wheel final gear device 35 are set so that the rotation speeds of the rear wheels Wrl and Wrr are increased by 2% to 5% compared to the rotation speeds of the front wheels Wfl and Wfr.

The 4WD ECU 60 is electrically connected to the clutch device 400, and is configured to control a coupling torque CuR of the clutch device 400. Specifically, the 4WD ECU 60 transmits an instruction value (target value) C3 of the coupling torque CuR to the clutch device 400. The clutch device 400 changes the coupling torque CuR so that the coupling torque CuR matches (becomes equal to) the instruction value C3. Further, the 4WD ECU 60 outputs the instruction value C3 of the coupling torque CuR to the braking ECU 70.

The braking ECU 70 of the second apparatus determines whether or not the degree of transmission of the driving force to the left rear wheel axle 38L and the right rear wheel axle 38R is smaller than the predetermined degree based on the current instruction value C3 ($=C3_{now}$) of the coupling torque CuR. That is, the braking ECU 70 determines whether or not the vehicle 10 is traveling in the specific state.

<Operation>

The CPU of the braking ECU 70 of the second apparatus is configured or programmed to execute the routine of FIG. 2 and the routine of FIG. 3. Hereinafter, a difference with the operation of the first apparatus will be mainly described.

In Step S220 of FIG. 2 and Step S325 of FIG. 3, the CPU determines whether or not the following Condition 3 is satisfied in place of Conditions 1 and 2. Here, "Cuth3" is a threshold for determining whether the degree of transmission of the driving force to the left rear wheel axle 38L and the right rear wheel axle 38R is smaller than the predetermined degree.

(Condition 3): $C3_{now} < Cuth3$

As described above, the second apparatus controls the coupling torque CuR of the clutch device 400 to change the degree of transmission of the driving force to the left rear wheel axle 38L and the right rear wheel axle 38R. In this configuration, the second apparatus determines that the vehicle 10 is traveling in the specific state when the current instruction value $C3_{now}$ of the coupling torque CuR is smaller than the predetermined threshold Cuth3. When determining that the vehicle 10 is traveling in the specific state, the second apparatus calculates the correction coefficients Ki. Therefore, the second apparatus can appropriately obtain the correction coefficients Ki in accordance with the difference in the wheel diameter.

The second apparatus multiplies the wheel speed Vwi by the correction coefficient Ki calculated in the above manner for each wheel to thereby correct the wheel speed Vwi for each wheel (that is, calculate the final wheel speed Vwhi after the correcting processing). Therefore, the influence of the difference in the wheel diameter on the wheel speed Vwhi can be reduced. As a result, an error between a true value of the slip ratio (SAi or SBi) and the slip ratio (SAi or SBi) calculated based on the wheel speed Vwhi can be decreased. Accordingly, the second apparatus can detect the instability of the vehicle behavior more accurately, and start and/or terminate the vehicle behavior stabilization control (the ABS control or the TRC control) at an appropriate timing.

The present disclosure is not limited to the embodiments described above, and various modification examples can be adopted within the scope of the present disclosure.

Modification Example 1

The indicator value indicative of the instability of the behavior of the vehicle is not limited to the above-mentioned "slip ratio SAi and slip ratio SBi". For example, the braking ECU 70 may adopt one of the wheel speeds Vwhi or an average value of the wheel speeds Vwhi as a reference speed, and calculate an absolute value of a difference between the reference speed and the wheel speed Vwhi as the indicator value. The braking ECU 70 may start the vehicle behavior stabilization control (the ABS control or the TRC control) when the indicator value exceeds a predetermined threshold.

Modification Example 2

The ABS control may include EBD (Electronic Brake force Distribution) control for adjusting braking force distribution between the front wheels and the rear wheels, and braking force distribution between the left wheels and the right wheels. The braking ECU 70 determines the "wheel Wi of which the slip ratio SAi exceeds an EBD start threshold Th_ebd" as an "EBD target wheel". In general, the EBD start threshold Th_ebd is smaller than the ABS start threshold Th_abs. The braking ECU 70 starts the EBD control on the EBD target wheel. Specifically, the braking ECU 70 controls the hydraulic circuit 43 to increase the braking pressures of the wheel cylinders 44i corresponding to the wheels other than the EBD target wheel Wi as the master cylinder pressure Pm increases, while maintaining/keeping the braking pressure of the wheel cylinder 44i corresponding to the EBD target wheel Wi. According to the configuration of the above-mentioned first apparatus and second apparatus, an error between a true value of the slip ratio (SAi) and the slip ratio (SAi) calculated based on the wheel speed Vwhi can be decreased. Therefore, the braking ECU 70 can perform the EBD control at an appropriate timing.

Even in a situation in which the braking pressure of the wheel cylinder 44i is maintained through the EBD control, the slip ratio SAi may increase. When the slip ratio SAi exceeds the ABS start threshold Th_abs, the braking ECU 70 performs the ABS control in place of the EBD control.

Modification Example 3

In Step S220 in the routine of FIG. 2 and Step S325 in the routine of FIG. 3, the CPU may be configured to make a "Yes" determination when the degree of transmission of the driving force to the left rear wheel axle 38L and the right rear wheel axle 38R is zero. In this case, the vehicle 10 is traveling in the two-wheel-drive state, and therefore, the rear wheels (Wrl and Wrr) are not slipping. The CPU calculates the correction coefficients Ki in the above-mentioned situation. Therefore, the CPU can obtain the correction coefficients Ki appropriately in accordance with the difference in the wheel diameter.

Modification Example 4

One or both of Step S210 and Step S215 in the routine of FIG. 2 may be omitted. Further, One or both of Step S315 and Step S320 in the routine of FIG. 3 may be omitted.

Modification Example 5

The recalculation condition of Step S240 in the routine of FIG. 2 is limited to the above example. The recalculation condition may include the following Condition 4.

(Condition 4): An elapsed time since the time point at which the correction coefficients Ki have been calculated in Step S230 becomes equal to or longer than a predetermined time Tm2.

When the Condition 4 is satisfied, the CPU may make a "Yes" determination in Step S240.

Modification Example 6

The condition to be determined in Step S215 in the routine of FIG. 2 and Step S320 in the routine of FIG. 3 is not limited to the above example. The condition to be determined in those steps may be a condition for determining whether or not the driver is operating the accelerator pedal 81a to accelerate the vehicle 10, or whether or not the driver is operating the brake pedal 41 to decelerate the vehicle 10. For example, the CPU may determine whether or not both of the following Conditions 5 and 6 are satisfied. Here, "APth" is a threshold for the accelerator opening, and "Pmth" is a threshold for the master cylinder pressure.

(Condition 5): AP<APth
(Condition 6): Pm<Pmth

Modification Example 7

In Step S335 in the routine of FIG. 3, the CPU may correct the wheel speed Vwi for each wheel Wi according to Expression (3) to thereby calculate the final (corrected) wheel speed Vwhi.

Modification Example 8

The vehicle 10 may include all of the first clutch 361, the second clutch 362, and the clutch device 400. In this configuration, in Step S220 in the routine of FIG. 2 and Step S325 in the routine of FIG. 3, the CPU determines that the vehicle 10 is traveling in the specific state when one or both of the following Conditions 7 and 8 are satisfied.

(Condition 7): Both of Conditions 1 and 2 are satisfied.
(Condition 8): Condition 3 is satisfied.

What is claimed is:
1. A control apparatus for a four-wheel-drive vehicle comprising:
a driving device configured to generate a driving force;
a braking device configured to apply a braking force to a left front wheel, a right front wheel, a left rear wheel, and a right rear wheel;

a front wheel differential device configured to transmit the driving force to a left front wheel axle and a right front wheel axle, and allow a differential between the left front wheel axle and the right front wheel axle;

a transfer gear device configured to transmit the driving force to a side of the rear wheels through a propeller shaft;

a rear wheel final gear device configured to transmit the driving force from the propeller shaft to a left rear wheel axle and a right rear wheel axle, a final gear ratio on the side of the rear wheels being set to be smaller than a final gear ratio on a side of the front wheels;

a coupling device configured to change a degree of transmission of the driving force from the propeller shaft to the left rear wheel axle and the right rear wheel axle;

a traveling state detector configured to detect traveling state information on a current traveling state of the vehicle, the traveling state information including a rotation-related value which is a value related to a rotation speed of each of the left front wheel, the right front wheel, the left rear wheel and the right rear wheel;

a coupling controller configured to control a coupling torque of the coupling device based on the traveling state information to change the degree of transmission of the driving force to the left rear wheel axle and the right rear wheel axle;

a wheel speed calculation controller configured to:
calculate, when at least a first condition is satisfied, a correction value for a wheel speed of each of the left front wheel, the right front wheel, the left rear wheel and the right rear wheel based on the rotation-related value, and calculate a wheel speed of each of the left front wheel, the right front wheel, the left rear wheel and the right rear wheel through use of the rotation-related value and the calculated correction value, the first condition being satisfied when coupling torque information on the coupling torque of the coupling device controlled by the coupling controller indicates that the degree of transmission of the driving force to the left rear wheel axle and the right rear wheel axle is smaller than a predetermined degree; and a vehicle behavior stabilization controller configured to:
calculate an indicator value indicative of an instability of a behavior of the vehicle based on the wheel speed for each of the left front wheel, the right front wheel, the left rear wheel and the right rear wheel, and perform vehicle behavior stabilization control for controlling the braking device in response to the calculated indicator value to stabilize the behavior of the vehicle.

2. The control apparatus for the four-wheel-drive vehicle according to claim 1, wherein the coupling device comprises:
a first coupling device configured to control a first coupling torque between a driving force output part of the rear wheel final gear device and the left rear wheel axle to change a degree of transmission of the driving force to the left rear wheel axle; and a second coupling device configured to control a second coupling torque between the driving force output part and the right rear wheel axle to change a degree of transmission of the driving force to the right rear wheel axle, and wherein the wheel speed calculation controller is configured to use information on the first coupling torque and information on the second coupling torque as the coupling torque information.

3. The control apparatus for the four-wheel-drive vehicle according to claim 1, wherein the coupling device comprises:
a clutch device provided between the propeller shaft and the rear wheel final gear device, and configured to control a clutch transmission force between the propeller shaft and the rear wheel final gear device to change the degree of transmission of the driving force to the left rear wheel axle and the right rear wheel axle, and wherein the wheel speed calculation controller is configured to use information on the clutch transmission force of the clutch device as the coupling torque information.

4. The control apparatus for the four-wheel-drive vehicle according to claim 1, wherein the wheel speed calculation controller is configured to determine that the first condition is satisfied when a state of the vehicle is a two-wheel-drive state in which the degree of transmission of the driving force to the left rear wheel axle and the right rear wheel axle is zero.

5. The control apparatus for the four-wheel-drive vehicle according to claim 1, wherein the wheel speed calculation controller is configured to calculate the correction value based on the rotation-related value when a second condition is satisfied in addition to the first condition, the second condition being satisfied when the traveling state information indicates that the vehicle is traveling straight, and a magnitude of an acceleration of the vehicle is smaller than a predetermined threshold.

* * * * *

UNITED STATES PATENT AND TRADEMARK OFFICE
CERTIFICATE OF CORRECTION

PATENT NO. : 10,889,290 B2
APPLICATION NO. : 16/690861
DATED : January 12, 2021
INVENTOR(S) : Yusuke Suetake, Noritsugu Iwazaki and Hidehisa Kato Page 1 of 1

It is certified that error appears in the above-identified patent and that said Letters Patent is hereby corrected as shown below:

In the Specification

In Column 4, Line(s) 18, delete "$\mathbf{C2_{now}}$" and insert --$\mathbf{C1_{now}}$--, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*